United States Patent [19]
Dixon

[11] Patent Number: 5,123,158
[45] Date of Patent: Jun. 23, 1992

[54] AUTOMATIC ASSEMBLY MACHINE WITH COORDINATELY MOVABLE FASTENER DRIVING GUN AND LOCATING TEMPLATE

[75] Inventor: Paul H. Dixon, Belvidere, Ill.

[73] Assignee: Dixon Automatic Tool, Inc., Rockford, Ill.

[21] Appl. No.: 691,740

[22] Filed: Apr. 26, 1991

[51] Int. Cl.⁵ .................. B23Q 7/10; B23Q 19/04
[52] U.S. Cl. ............................. 29/714; 29/720; 29/809; 81/57.37; 81/430
[58] Field of Search ............. 29/714, 720, 809; 81/57.37, 430, 431

[56] References Cited

U.S. PATENT DOCUMENTS

| | | | |
|---|---|---|---|
| 3,279,045 | 10/1966 | Dixon | 29/211 |
| 3,656,520 | 4/1972 | Caffa | 81/430 |
| 3,675,302 | 7/1972 | Dixon | 29/211 |
| 3,910,325 | 10/1975 | Dixon | 144/32 |
| 4,602,537 | 7/1986 | Dixon | 81/430 |
| 4,624,609 | 11/1986 | Pickett | 29/720 X |
| 4,671,143 | 6/1987 | Heck et al. | 81/431 |

Primary Examiner—Timothy V. Eley
Attorney, Agent, or Firm—Leydig, Voit & Mayer

[57] ABSTRACT

An automatic screwdriver is mounted on a coordinately movable slide structure to shift horizontally to various positions above a workpiece and also to shift vertically to drive screws into the workpiece. A stylus which moves with the slide structure coacts with an overhead template to locate the gun in precise preselected driving positions over the workpiece. Jaws hold the screw as the screwdriver is advanced downwardly and are cammed open during driving of the screw. A link stops the jaws a predetermined distance above the workpiece to permit the jaws to open in the event another screw or other obstruction is located closely adjacent the screw being driven.

10 Claims, 4 Drawing Sheets

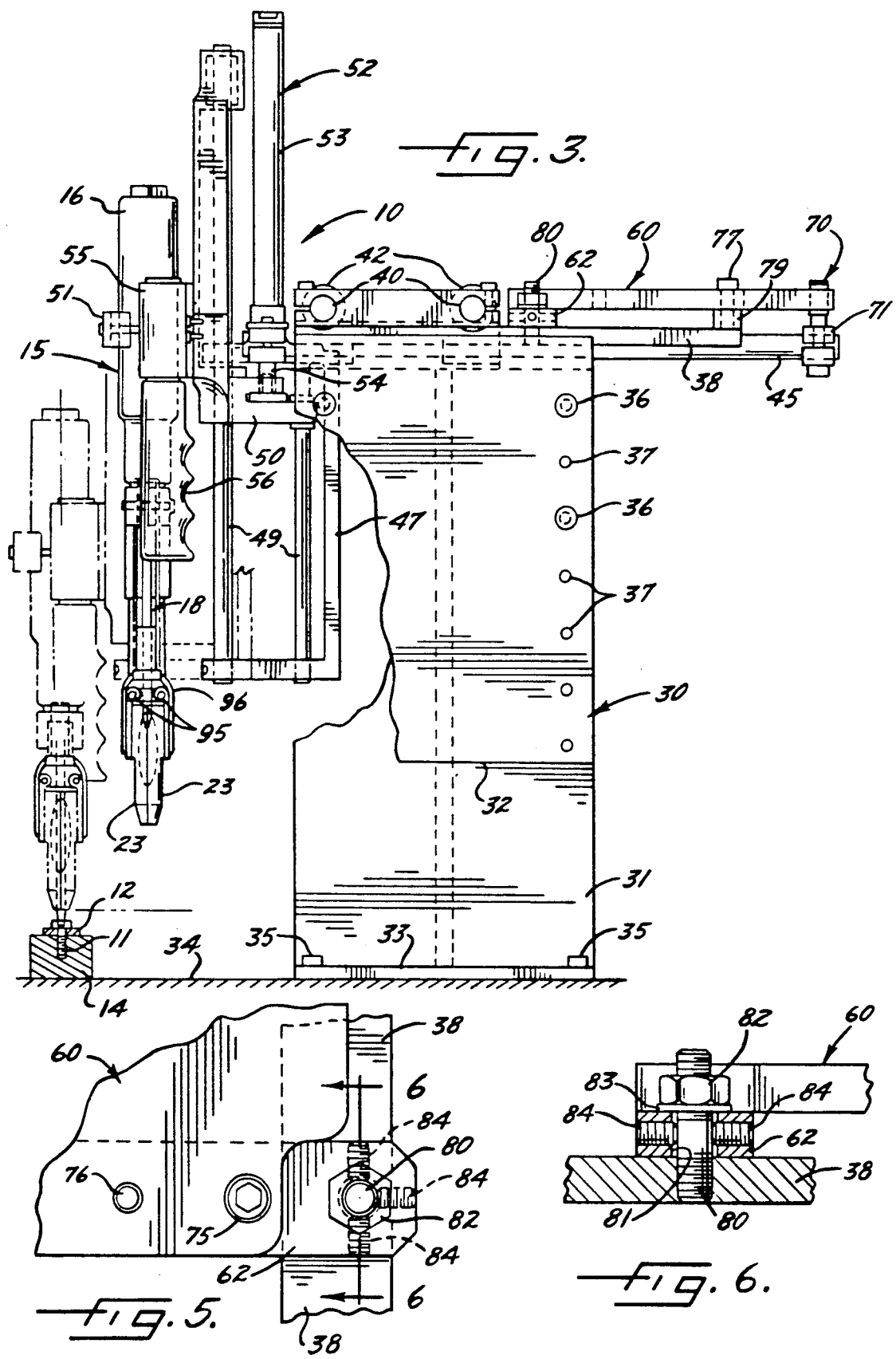

AUTOMATIC ASSEMBLY MACHINE WITH COORDINATELY MOVABLE FASTENER DRIVING GUN AND LOCATING TEMPLATE

BACKGROUND OF THE INVENTION

This invention relates to an automatic assembly machine and, more particularly, to an assembly machine of the type having an automatic fastener driver for assembling screws, nuts and the like with workpieces.

Automatic assembly machines of the same general type as the machine of the present invention are disclosed in Dixon U.S. Pat. No. 3,279,045; Dixon U.S. Pat. No. 3,675,302; and Dixon U.S. Pat. No. 3,910,325. The fastener drivers of such machines include a rotary motor operable to drive a screwdriver bit, a socket wrench or other tool; the fasteners being fed one-by-one to the tool. The machines are used by moving the fastener driver horizontally to an appropriate position over a workpiece and then by moving the driver downwardly to effect assembly of the fastener with the workpiece. The fastener driver then is retracted upwardly and is repositioned horizontally to a different position over the workpiece preparatory to driving the next fastener.

In the machine disclosed in Dixon U.S. Pat. No. 3,675,302, the fastener driver is carried on an articulated support which permits the fastener driver to be swung to various positions over the workpiece. A template is employed to enable the machine operator to locate the fastener driver at precisely predetermined positions with respect to the workpiece. The template, however, is located below the workpiece and cannot be clearly viewed by the operator.

In some respects, the present assembly machine is similar to that disclosed in Dixon U.S. application Ser. No. 07/581,575, filed Sep. 11, 1990. In that machine, screws are blown one-by-one through a delivery tube to an internal chamber defined within a pair of opposing chuck jaws adapted to pivot between open and closed positions and normally biased to their closed positions. A power-rotated driver advances downwardly into engagement with the screw held by the jaws and causes the screw to cam the jaws to their open positions so as to permit driving of the screw. While the jaws maintain excellent control over the screw, the jaws are positioned in contact with or very close to the surface of the workpiece at the time the jaws are cammed open by the screw. If there is an obstruction or another screw closely adjacent the screw being driven, the jaws may be prevented from pivoting to their open positions.

SUMMARY OF THE INVENTION

One of the aims of the present invention is to provide a new and improved automatic assembly machine having a locating template which is disposed in an overhead position so as to be in clear view of the machine operator and to enable the template to be quickly and easily removed and replaced.

Another object of the invention is to provide a locating template which may be easily adjusted into precise correspondence with the position of the fastener driver.

Still a further object is to provide an assembly machine having a fastener driver which may be adjusted along rectilinear coordinates to a desired position above the workpiece, the driver being supported for coordinate adjustment by precise but comparatively light-weight slide structure.

Another important object of the invention is to provide a fastener driver of the type in which the jaws are cammed open by the fastener during driving of the fastener but in which the jaws are stopped and held in upwardly spaced relation from the workpiece so as to enable the jaws to open in spite of the presence of adjacent fasteners or other obstructions.

These and other objects and advantages of the invention will become more apparent from the following detailed description when taken in conjunction with the accompanying drawings.

BRIEF DESCRIPTION OF THE DRAWINGS

FIG. 3 is a side elevational view of the machine as seen along the line 3—3 of FIG. 1.

FIG. 5 is an enlarged top plan view of a portion of the machine as seen along the line 5—5 of FIG. 2.

FIG. 6 is a fragmentary cross-section taken substantially along the line 6—6 of FIG. 5.

DETAILED DESCRIPTION OF THE PREFERRED EMBODIMENT

Figure 1:
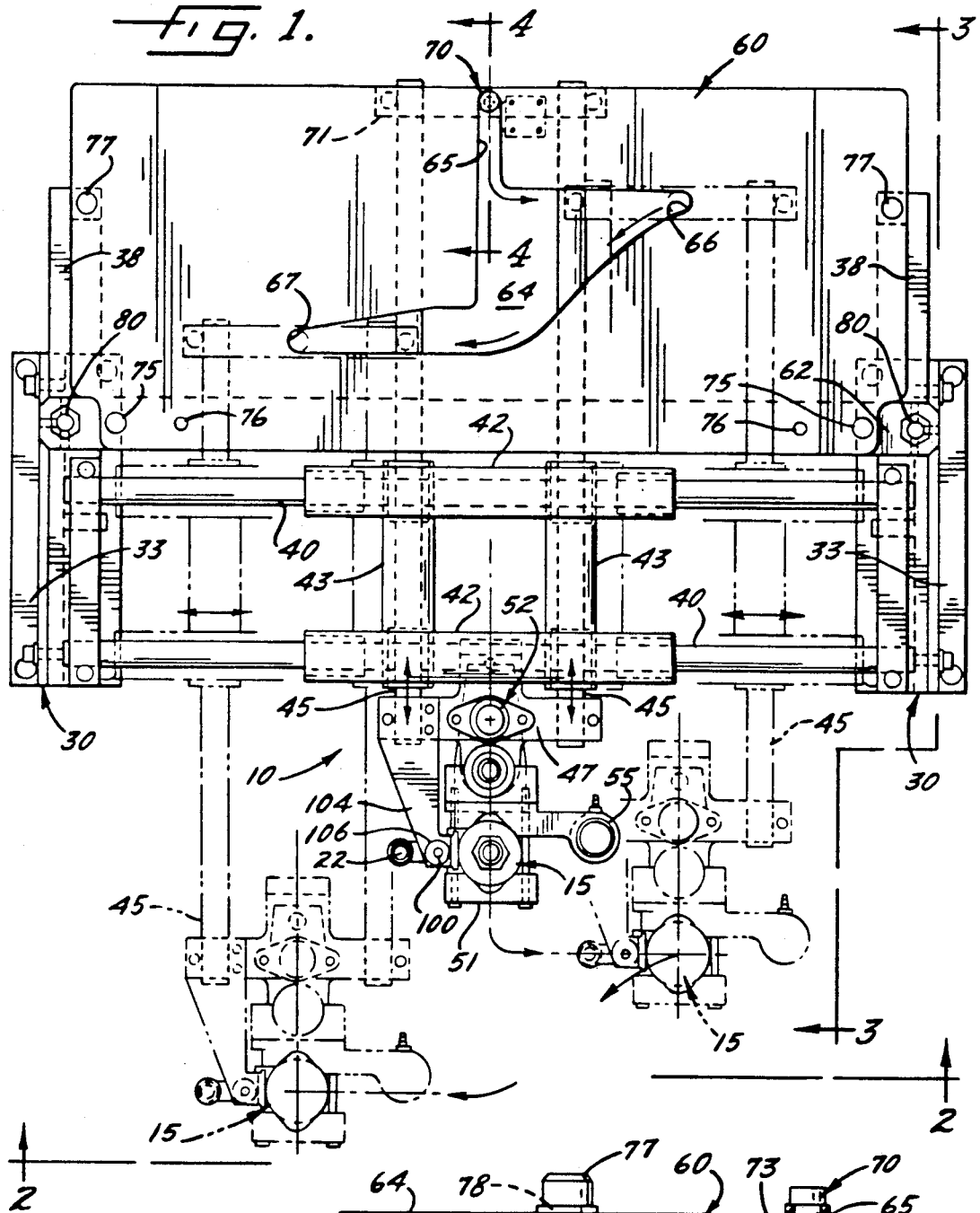
FIG. 1 is a top plan view of a new and improved automatic assembly machine incorporating the unique features of the present invention.

For purposes of illustration, the invention has been shown in the drawings as incorporated in an automatic assembly machine 10 operable to drive threaded fasteners 11 (FIG. 2) and to cause the fasteners to hold one or more individual workpieces 12 in assembled relation with an underlying base workpiece 14. While various types of fasteners may be handled by the machine, the fasteners typically are screws. By way of example only, the workpieces 12 have been shown as being small plates while the base workpiece 14 has been illustrated as being a comparatively large block.

The assembly machine 10 includes an automatic fastener driver 15, commonly called a gun, having a generally cylindrical housing 16 (FIG. 7) which encloses a rotary air motor (not visible). The motor is adapted to rotate a screwdriver bit 18 having an elongated shank 19 whose lower free end is formed with a flat driving blade 20 adapted to fit in a slot in the head of the screw 11. In this instance, the motor is of the push-to-start type, meaning that the motor starts turning the driver bit 18 when an upward force is applied to the bit.

In operation of the machine 10, screws 11 are blown one at a time through a flexible delivery tube 22 (FIG. 2) to a chuck defined by a pair of jaws 23 (FIGS. 3 and 8) which are adapted to pivot between closed and opened positions. The gun 15 is advanced downwardly from a retracted position shown in solid lines in FIG. 2 and, during such movement, the lower end of a screw 11 in the jaws 23 moves through a hole 25 (FIG. 8) in one of the work plates 12 and then is threaded into a tapped hole 26 in the work block 14 upon being rotated by the driver bit 18. After the screw has been driven, the gun 15 is raised upwardly to the retracted position and is horizontally re-located to a different position over the work block 14 preparatory to driving another screw for assembling the other work plate 12 to the work block.

In accordance with one aspect of the present invention, the driving gun 15 is supported to move horizontally along rectilinear coordinates to different positions above the work block 14. The structure for supporting the gun 15 for rectilinear movement is relatively simple and light in weight and allows the gun to be shifted smoothly and with comparatively low friction.

Figure 2:
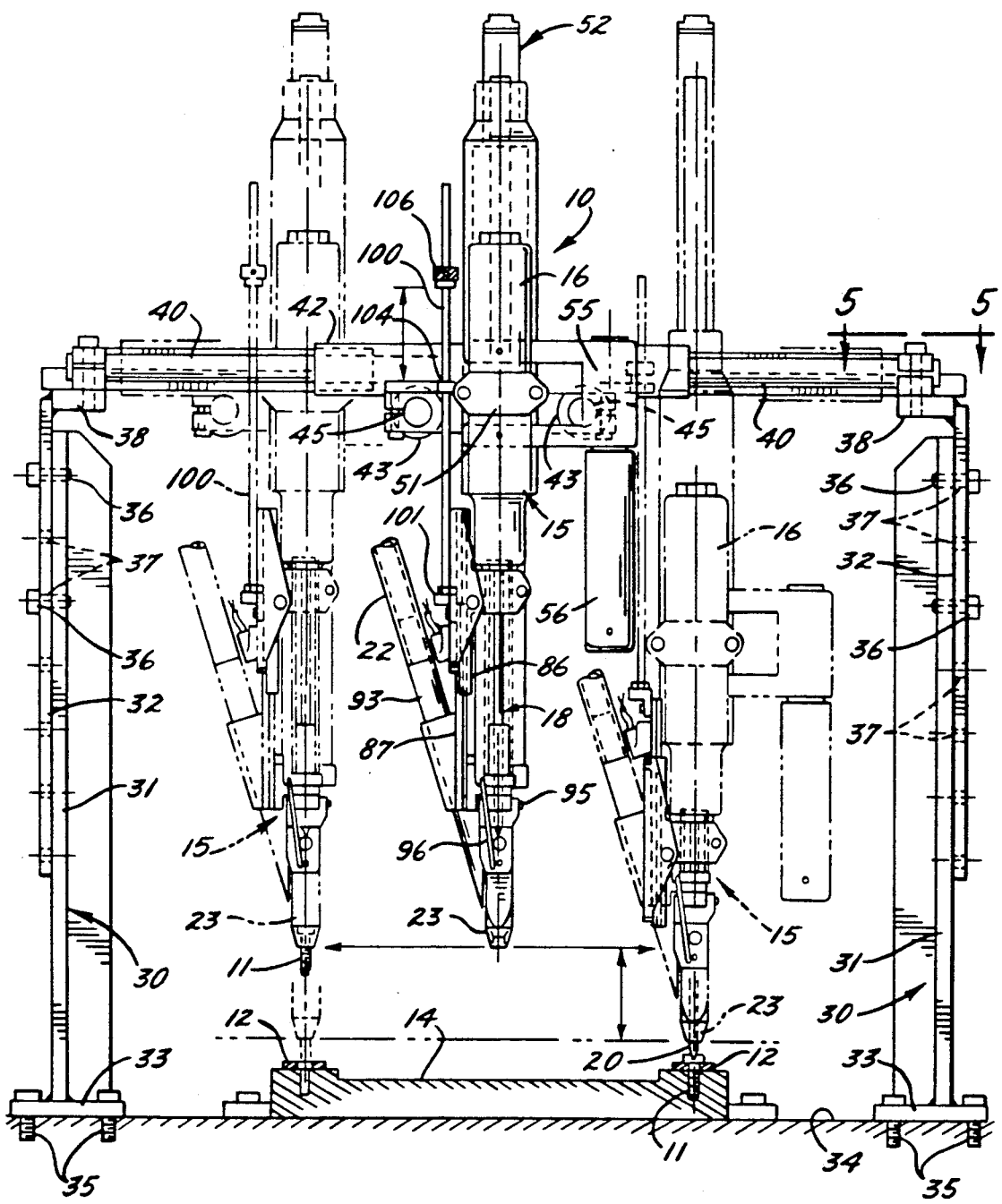
FIG. 2 is a front elevational view of the machine as seen along the line 2—2 of FIG. 1.

More specifically, the gun 15 is mounted on a main support which is defined in part by two laterally spaced side sections or pedestals 30 (FIGS. 2 and 3 each having a lower plate-like member 31 and an upper plate-like member 32. Each lower plate 31 includes a foot 33 which is anchored to an underlying table or base 34 by screws 35. Each upper plate 32 lies along the outboard side of the lower plate 31 and is fastened thereto by two vertically spaced screws 36 extending through holes 37 in the upper plate and threaded into tapped holes (not visible) in the lower plate. Advantageously, several (e.g., seven) vertically spaced holes 37 are formed in each upper plate to enable the upper plate to be adjusted vertically relative to the lower plate and thereby permit adjustment of the vertical spacing of the gun 15 above the base 34 when the gun is in its retracted position.

Bars 38 (FIG. 2) are secured to and project laterally inwardly from the upper edges of the upper pedestal plates 32. Two cylindrical guide rods 40 (FIG. 1) extend laterally and horizontally between the bars 38 and are secured near their ends to the bars. The two rods 40 are parallel to one another and lie in the same horizontal plane with one rod being a front rod and the other rod being a rear rod.

Telescoped slidably over the guide rods 40 are cylindrical sleeves 42 (FIG. 1) whose inner surfaces are lined with an anti-friction material such as Teflon. The sleeves thus are capable of sliding freely on the rods and along an axis or coordinate extending laterally of the machine 10.

Two laterally spaced and parallel sleeves 43 (FIG. 1) extend horizontally and in the fore-and-aft direction between the sleeves 42. The sleeves 43 are located in a common horizontal plane beneath the sleeves 42 in perpendicular relation thereto and are fixed rigidly to the underside of the sleeves 42 so as to move laterally in unison with the latter sleeves. The inner surfaces of the sleeves 43 also are lined with Teflon or the like.

Telescoped into and extending through the sleeves 43 are two front-to-rear extending rods 45. The rods 45 are adapted to slide back and forth in the sleeves 43 along an axis or coordinate which is perpendicular to the lateral coordinate.

The gun 15 is secured to and moves with the forward end portions of the rods 45 and also is adapted to move upwardly and downwardly relative to such rods. For this purpose, a mounting support or bracket 47 (FIGS. 1 and 3) extends between and is fastened to the forward end portions of the rods 45, the mounting bracket projecting downwardly from the rods and being generally C-shaped in side elevation. Front and rear vertically extending guide rods 49 (FIG. 3) are carried by the mounting bracket 47 and support a carriage 50 for up and down movement. The housing 16 of the gun 15 is secured rigidly to the forward side of the carriage 50 by a clamp 51.

Power-operated means are provided for advancing the gun 15 downwardly and for retracting the gun upwardly. Herein, these means comprise a reciprocating pneumatic actuator 52 (FIG. 3) having a cylinder 53 attached to the mounting bracket 47 and having a rod 54 attached to the carriage 50. A control valve 55 for the actuator 52 is attached to the forward side of the carriage and is associated with an operating handle 56. When the handle is manually pulled downwardly, the valve is shifted to cause pressurized air to be admitted into the upper end of the cylinder 53 and thereby shift the carriage 50 and the gun 15 downwardly. Upon release of the handle, the valve is shifted in the opposite direction by a spring (not shown) and admits pressurized air into the lower end of the cylinder 53 in order to retract the carriage and the gun. Reference is made to Dixon U.S. application Ser. No. 07/661,185, filed Feb. 27, 1991 for a more detailed disclosure of the valve 55 and the handle 56.

The handle 56 also serves as a steering handle. By pushing or pulling horizontally on the handle, the machine operator may move the carriage 50 and the mounting bracket 47 horizontally to cause the sleeves 42 to slide laterally on the rods 40 and to cause the rods 45 to slide back and forth in the sleeves 43. In this way, the gun 15 may be pulled forwardly and to the right from the solid line position shown in FIGS. 1 and 2 to the phantom line positions shown at the right sides of those views. Thereafter, the handle may be pulled downwardly to cause the gun to advance downwardly and effect assembly of the underlying work plate 12 to the work block 14. After effecting retraction of the gun by allowing the handle 56 to shift upwardly, the handle may be pulled forwardly and to the left to locate the gun in the phantom line positions shown at the left of FIGS. 1 and 2 and thereby enable the gun to assemble the other work plate 12 to the work block 14 when the gun is next advanced downwardly.

It will be apparent from the foregoing that the rods 40 and 45 and the sleeves 42 and 43 enable the gun 15 to be moved coordinately and to be located in any desired position above the work block 14. The rods and sleeves form a very light weight and yet precise and durable slide structure and permit smooth and easy positioning of the gun with low friction.

In accordance with another aspect of the invention, a template 60 is provided to enable the gun 15 to be quickly positioned at precise preselected positions over the work block 14. The template is particularly characterized in that it is located in an overhead position to enable the machine operator to clearly view the template and to facilitate quick replacement of the template. Moreover, the template may be adjusted into precise positional correspondence with the gun 15.

More particularly, the template 60 is in the form of a flat horizontal plate located just to the rear of and approximately at the same elevation as the rear guide rod 40. A laterally extending mounting bar 62 (FIGS. 1 and 5) underlies the forward edge portion of the template and is secured to the template and the bars 38 of the pedestals 30 in a manner to be described subsequently.

A large opening 64 (FIG. 1) extends vertically through the template 60 and is formed with a plurality of detent surfaces, there being three detent surfaces 65, 66 and 67 in the present instance with each detent surface being defined by a closed-end notch in the opening 64. The notch 65 is located in the rear portion of the template and corresponds to the normal or "home" position of the gun 15. The notch 66 is located forwardly and to the right of the notch 65 and corresponds positionally to the location of the gun 15 necessary to assemble the right-hand (FIG. 2) work plate 12 to the work block 14. The notch 67 is located to the eft and forwardly of the notches 65 and 66 and corresponds positionally to the location of the gun when the left-hand work plate 12 is being assembled to the work block 14.

Figure 4:
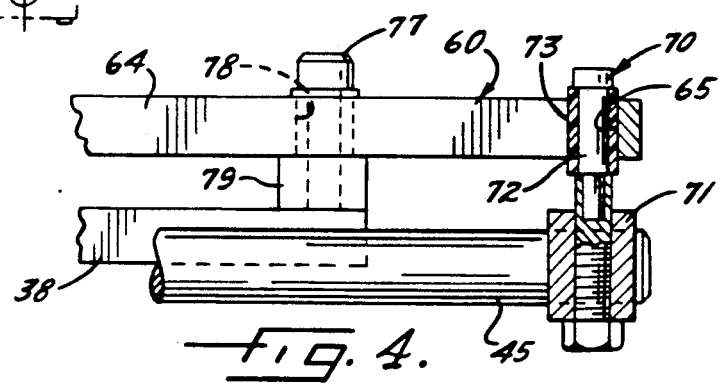
FIG. 4 is an enlarged fragmentary cross-section taken substantially along the line 4—4 of FIG. 1.

Cooperating with the template 60 is a stylus 70 (FIGS. 1 and 4) which projects upwardly into the opening 64 in the template. Advantageously, the stylus is located at the center of and extends upwardly from a crossbar 71 which laterally spans and is connected to the rear end portions of the rods 45. Thus, the stylus moves forwardly and rearwardly with the rods 45 when the gun 15 is moved forwardly and rearwardly and also moves laterally with the rods 45 when the gun is moved laterally and the sleeves 42 slide along the rods 40.

Herein, the stylus 70 is formed by a stud 72 (FIG. 4) secured to and projecting upwardly from the crossbar 71 and by an anti-friction sleeve 73 encircling a portion of the stud. As the rods 45 move during shifting of the gun 15, the stylus travels within the opening 64 and rides along the edges thereof. By holding the stylus against the edges of the opening and moving the gun to cause the stylus to shift into the notches 66 and 67, the machine operator may easily and precisely locate the gun in proper positions to assemble the left and right work plates 12. Because the template 60 is located in an overhead position, the operator can clearly see the position of the stylus at any given time so as to facilitate quick and precise positioning of the gun.

The template 60 is secured detachably to the front mounting bar 62 by screws 75 (FIG. 1) and locating pins 76. In addition, screws 77 (FIG. 4) extend through enlarged holes 78 formed in the side portions of the template and clamp the template to spacers 79 on the bars 38 of the pedestals 30.

In order for the template 60 to locate the gun 15 precisely, it is important that the template be positioned on the pedestals 30 and relative to the gun such that the notches 66 and 67 locate the driver bit 18 of the gun directly over the holes 25 in the work plates 12 when the stylus 70 is in the notches. Means are provided to enable precise positioning of the template in spite of dimensional variations in the mounting bracket 47, etc. Herein, these means comprise threaded rods 80 (FIG. 6) which extend through enlarged holes 81 formed in the end portions of the front mounting bar 62, each screw being threaded into a tapped hole in the pedestal bar 38. Normally, each rod 80 is clamped to the mounting bar 62 by a nut 82 and washer 83 and thus clamps the mounting bar to the pedestal bar 38. Three set screws 84 (FIGS. 5 and 6) spaced 90 degrees from one another are threaded into the mounting bar 62, project into the hole 81 and engage the rod 80. By loosening each nut 82, the set screws 84 may be adjusted to shift the mounting bar 62 back or forth and/or laterally to the extent necessary to locate the template 60 properly and precisely with respect to the gun 15. During such shifting, the clamping screws 77 are loosened, and the enlarged holes 78 permit the template to move relative to such screws. Once the position of the template has been established, the nuts 82 and the screws 77 are tightened in order to clamp the template in that position.

Accordingly, the mounting bar 62 may be adjusted to a precise position during initial set up of the machine 10 to enable accurate positioning of the template 60 in spite of a build-up of tolerance variations in the different components of the machine. By removing the screws 75 and 77, the template may be easily removed and replaced with a template having a differently shaped opening 64, the overhead location of the template facilitating a quick changeover. When the upper members 32 of the pedestals 30 are adjusted to change the retracted position of the gun 15, the template 60 also is adjusted vertically to keep the elevation of the template correlated with that of the gun.

Figure 7:
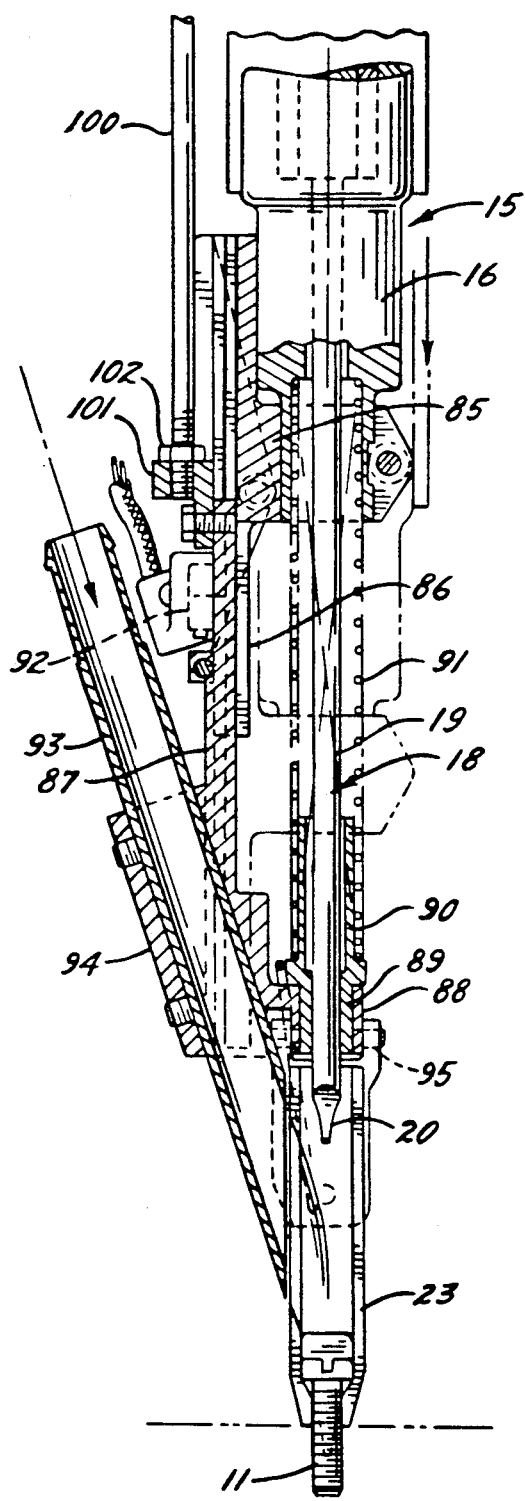
FIG. 7 is an enlarged fragmentary cross-section taken axially through the fastener driver of the machine.

As shown in FIG. 7, a casting 85 is fastened rigidly to the lower end portion of the motor housing 16 and includes a slideway 86 which extends downwardly along one side of the gun 15. A slide 87 is guided for up and down movement by the slideway and is formed with a laterally extending tubular block 88. Located within the block is a sleeve bearing 89 which rotatably supports the lower end portion of the shank 19 of the driving bit 18. A flanged sleeve 90 is formed integrally with and extends upwardly from the bearing 89 and serves as a guide and a seat for the lower end portion of a coiled compression spring 91 which is telescoped over the driver shank 19. The upper end portion of the spring bears against the lower end of the motor housing 16.

When the gun 15 is in its retracted position shown in FIG. 7, the spring 91 acting between the motor housing 16 and the flanged sleeve 90 pushes the slide 87 downwardly relative to the slideway 86 to a lowered position, downward movement of the slide being limited by stop means (not shown). When the slide is in its lowered position, a switch 92 on the slide engages a stop on the slideway 86 to produce a signal effecting delivery of a screw 11 to the gun 15. Screws are delivered to the gun from a supply (not shown) and are conveyed through the flexible delivery tube 22 by pressurized air in a manner similar to that disclosed in Dixon U.S. Pat. No. 3,929,176. The flexible tube 22 is connected to a metal delivery tube 93 (FIG. 7) which is supported within a tubular boss 94 on the outboard side of the slide 87.

Screws 11 discharged from the tube 93 are delivered to and are held by the jaws 23, which are disposed in opposing relation and which are supported to swing between closed and open positions by pivot pins 95 (FIG. 3) connected to the slide 87. A horseshoe-shaped leaf spring 96 is fixed at its upper end to the slide and its free ends act against the jaws 23 to bias the jaws toward their closed positions.

A screw 12 is delivered to the jaws 23 from the tube 93 when the gun 15 is in a raised position shown in FIG. 7. In this position, the driving bit 18 is in a retracted inactive position above the discharge end of the tube 93 in order to enable the screw from the tube to enter the space between the jaws 23.

Figure 8:
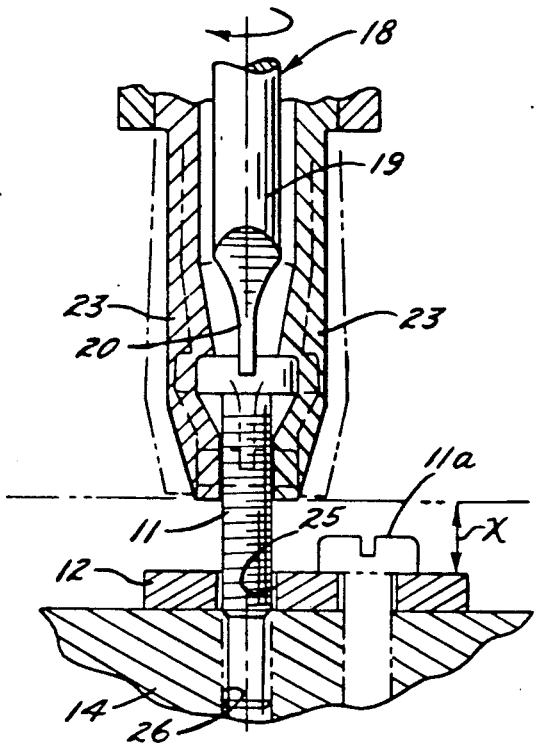
FIG. 8 is an enlarged cross-section showing certain components of the fastener driver just as a fastener is starting to be driven into a workpiece.
Figure 9:
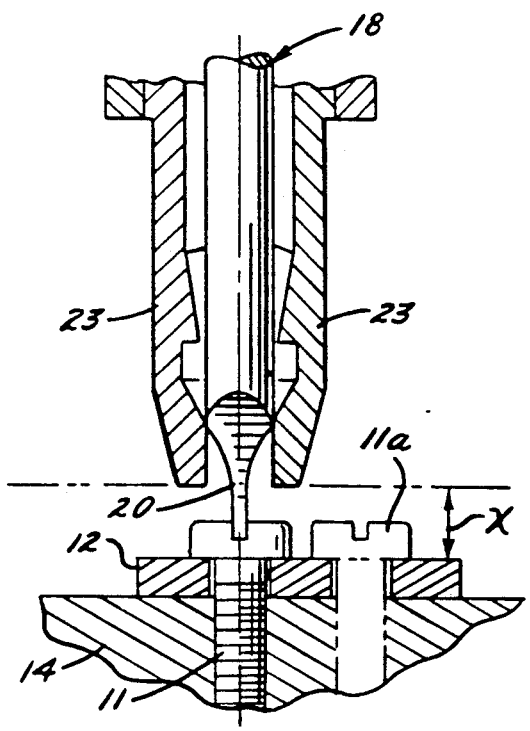
FIG. 9 is a view similar to FIG. 8 but shows the components of the fastener driver as positioned just after completing driving of the fastener.

A cycle is initiated by the operator pulling the handle 56 downwardly to cause the actuator 52 to shift the carriage 50 and the gun 15 downwardly on the rods 49. Initially, the housing 16 with the slideway 86 and the slide 87 with the jaws 23 all move downwardly in unison. According to another aspect of the invention, downward movement of the slide and the jaws is stopped before the jaws contact the work plate 12, and the jaws are held in upwardly spaced relation with the work plate as shown in FIGS. 8 and 9. In this way, the jaws may swing open even if there is another screw 11A or other obstruction closely adjacent the screw being driven.

Stopping of the slide 86 and the jaws 23 is effected by a vertically extending rod-like link 100 (FIGS. 2 and 7). The lower end of the link 100 is threaded into a lug 101 (FIG. 7) on the slide 87 and is locked in place by a nut 102. The upper end portion of the link 100 extends upwardly and slidably through a flange 104 (FIG. 1) on the mounting bracket 47 and carries a stop collar 106 (FIG. 2) which is fixed to the link but which may be selectively adjusted along the link.

When the gun 15 is in its upwardly retracted position shown in solid lines in FIG. 2, the stop collar 106 on the link 100 is spaced a substantial distance above the flange 104. As the gun first is advanced downwardly, the link 100 slides downwardly through the flange and, during this time, the housing 16 with the slideway 86 and the slide 87 with the jaws 23 all move downwardly in unison.

After the gun 15 has advanced downwardly a predetermined distance, the stop collar 106 on the link 100 engages the flange 104 on the bracket 47. Such engagement stops further downward movement of the link 100, the slide 87 and the jaws 23 and keeps the jaws spaced a predetermined distance X above the work plate 12 as shown in FIGS. 8 and 9. With further downward advancement of the gun 15, the housing 16 and the slideway 86 move downwardly relative to the stopped slide 87 and jaws 23, the spring 91 compressing to permit such movement. The driving bit 18 thus moves downwardly into engagement with the screw in the jaws as shown in FIG. 8 and starts pushing the screw 11 out of the jaws. Once the end of the screw contacts the work block 14, the motor starts turning the driving bit 18 so as to drive the screw into the work block. As the screw is driven, its head moves downwardly through the jaws and cams the jaws open in the manner disclosed in Dixon U.S. application Ser. No. 07/581,575, filed Sep. 11, 1990. Because the jaws are spaced above the work plate 12 and the adjacent screw 11A, the latter screw does not interfere with opening of the jaws.

Once the screw 11 has been fully driven as shown in FIG. 9, the actuator 52 is reversed to retract the gun 15. During such retraction, the spring 90 expands to cause the slide 87 and the jaws 23 to move downwardly relative to the housing 16 and the slideway 86 and to return the components to the position shown in FIG. 7. During final retraction of the gun, the link 100 pushes the stop collar 106 upwardly away from the flange 104 to the position shown in solid lines in FIG. 2.

Thus, the foregoing arrangement stops the jaws 23 a predetermined distance X above the work plate 12 to enable the jaws to open in spite of the presence of another screw 11A or the like on the work plate. By adjusting the stop collar 106 vertically along the link 100 to change the effective length of the link, the distance X may be selectively adjusted to locate the ends of the jaws as closely as possible to the work plate while taking adjacent obstructions into account. Adjustment of the stop collar also enables the jaws to be stopped at a distance correlated with the height of the particular work plate.

I claim:

1. An automatic assembly machine for driving threaded fasteners vertically into a workpiece, said machine comprising a fixed support, a power-rotated screwdriver for driving fasteners, and means for mounting said screwdriver on said support to move horizontally to various positions above said workpiece and for precisely locating said screwdriver horizontally at a plurality of preselected driving positions with respect to said workpiece, said means comprising a pair of horizontally extending and parallel first rods secured to said support, a pair of first sleeves telescoped over and slidable along said first rods, a pair of horizontally extending and parallel second sleeves secured to and extending perpendicular to said first sleeves, a pair of second rods telescoped into and slidable within said second sleeves, means securing said screwdriver to said second rods whereby said screwdriver may be moved horizontally to various positions above said workpiece by sliding said second rods within said second sleeves and by sliding said first and second sleeves along said first rods, a horizontal template secured to said support in proximity to said second rods and having a vertically extending opening formed therein, said opening defining a plurality of detent surfaces corresponding positionally to said plurality of preselected driving positions, and a stylus movable with said second rods and extending into said opening, said stylus being engageable with said detent surfaces to locate said screwdriver horizontally at said preselected driving positions.

2. An automatic assembly machine as defined in claim 1 further including a horizontal bar secured to and extending between said second rods, said stylus being secured to and extending vertically from said bar.

3. An automatic assembly machine as defined in claim 2 in which said bar is positioned below said template, said stylus extending upwardly from said bar and into said opening.

4. An automatic assembly machine as defined in claim 1 in which said support includes a pair of laterally spaced side sections each having upper and lower members, the upper member of each side section being adjustable vertically relative to the lower member thereof, means for releasably securing the upper member of each side section in a selected vertical position relative to the lower member thereof, said rods, said sleeves, said screwdriver and said template being adjustable vertically with said upper members.

5. An automatic assembly machine as defined in claim 1 further including means attaching said template to said support and permitting selective adjustment of said template relative to said support along an axis parallel to said first rods and along an axis parallel to said second rods.

6. An automatic assembly machine for driving threaded fasteners vertically into a workpiece, said machine comprising a fixed support, a screwdriver having a power-rotated driving bit, means mounting said screwdriver on said support to move horizontally to various positions above said workpiece and to move downwardly to cause said bit to drive fasteners into the workpiece, and means for locating said screwdriver horizontally at a plurality of preselected driving positions relative to said workpiece, said means comprising a horizontal template detachably secured to said support at an elevation spaced a substantial distance above said driving bit, a vertically extending opening formed through said template and having a plurality of detent surfaces corresponding positionally to said plurality of preselected driving positions, a stylus movable horizontally with said screwdriver and extending upwardly into said opening, said stylus being engageable with said detent surfaces to locate said screwdriver horizontally at said preselected driving positions, and means mounting said template on said support for selective adjustment along two horizontally extending and mutually perpendicular axes.

7. An automatic assembly machine as defined in claim 6 in which said support includes a pair of laterally spaced side sections each having upper and lower members, the upper member of each side section being adjustable vertically relative to the lower member thereof and adapted to be releasably secured in a selected vertical position relative to such lower member, said screwdriver and said template being carried by and being adjustable with said upper members.

8. An automatic assembly machine for driving a threaded fastener into a workpiece, said machine comprising a main support, a screwdriver having a housing mounted to move upwardly and downwardly on said support, said screwdriver having a power-rotated driving bit movable upwardly and downwardly with said housing, a slide supported to move upwardly and downwardly with said housing and to move upwardly and downwardly on said housing, a pair of jaws mounted on said slide to move upwardly and downwardly with said slide and to swing relative to said slide between open and closed positions, said jaws holding a fastener when in said closed positions and being cammed to said open positions by said fastener as an incident to the fastener moving downwardly relative to said jaws, a mechanism for advancing said housing, said bit, said slide, said jaws and said fastener downwardly in unison relative to said support, connecting means between said support and said slide for stopping further downward movement of said slide and said jaws when said jaws have advanced downwardly a predetermined distance and before said jaws reach said workpiece, and means for permitting continued downward advance of said housing and said bit after said slide and said jaws have been stopped by said means whereby said bit engages said fastener and moves said fastener downwardly relative to said jaws so as to cause said fastener to cam said jaws to said open positions.

9. An automatic assembly machine as defined in claim 8 in which said connecting means comprise a link extending between said support and said slide, said link permitting said slide to move downwardly with said housing and relative to said support through said predetermined distance and thereafter stopping further downward movement of said slide relative to said support.

10. An automatic assembly machine as defined in claim 9 including means for selectively adjusting the effective length of said link thereby to enable adjustment of said predetermined distance.

* * * * *